United States Patent
Shin et al.

(10) Patent No.: US 9,380,516 B2
(45) Date of Patent: Jun. 28, 2016

(54) LOCAL WIRELESS DATA COMMUNICATION SYSTEM, AND METHOD AND APPARATUS FOR AUTOMATICALLY SETTING INFORMATION IN THE SYSTEM

(71) Applicant: SK PLANET CO., LTD., Gyeonggi-Do (KR)

(72) Inventors: Chulyong Shin, Seoul (KR); Jaehyung Huh, Gyeonggi-Do (KR)

(73) Assignee: SK PLANET CO., LTD. (KR)

( * ) Notice: Subject to any disclaimer, the term of this patent is extended or adjusted under 35 U.S.C. 154(b) by 0 days.

(21) Appl. No.: 14/626,380

(22) Filed: Feb. 19, 2015

(65) Prior Publication Data

US 2015/0282046 A1    Oct. 1, 2015

(30) Foreign Application Priority Data

Mar. 25, 2014    (KR) .................. 10-2014-0034963

(51) Int. Cl.
*H04W 40/24*    (2009.01)
*H04W 48/12*    (2009.01)
*H04W 24/02*    (2009.01)

(52) U.S. Cl.
CPC ............ *H04W 40/244* (2013.01); *H04W 48/12* (2013.01); *H04W 24/02* (2013.01)

(58) Field of Classification Search
CPC .... H04W 40/244; H04W 48/10; H04W 24/02
See application file for complete search history.

(56) References Cited

U.S. PATENT DOCUMENTS

| | | | |
|---|---|---|---|
| 2007/0197238 A1* | 8/2007 | Nakajima | 455/466 |
| 2009/0201377 A1* | 8/2009 | Okano | 348/207.1 |
| 2010/0253788 A1* | 10/2010 | Okano | 348/207.1 |
| 2014/0359738 A1* | 12/2014 | Nakajima | 726/7 |
| 2015/0140982 A1* | 5/2015 | Postrel | 455/418 |

* cited by examiner

*Primary Examiner* — Leon Flores
(74) *Attorney, Agent, or Firm* — Baker Hostetler LLP (57) ABSTRACT

A local wireless data communication system and a method and apparatus for automatically setting information in the system, in which a service device is accessed via the Internet by setting Internet access using Internet access information received from a management terminal device and beacon identification information that is to be included in a beacon signal is automatically set by requesting and receiving identification information from the accessed service device. Thus, the beacon identification information may be automatically set and changed in a simple manner by a beacon device without performing a complicated process of accessing the beacon device and changing the settings of the beacon device by the management terminal device in order to set or change the beacon identification information. Also, the beacon device may be managed in a more convenient and simpler manner without an administrator's efforts. Also, costs and a time needed to manage the beacon device may be reduced.

9 Claims, 5 Drawing Sheets

FIG. 5 ved from a management terminal device and to automatically set beacon identification information included in a beacon signal by receiving identification information according to a request from the accessed service device, and a method and apparatus for automatically setting information in the system.

LOCAL WIRELESS DATA COMMUNICATION SYSTEM, AND METHOD AND APPARATUS FOR AUTOMATICALLY SETTING INFORMATION IN THE SYSTEM

CROSS-REFERENCE TO RELATED APPLICATION

This application claims priority to and the benefit of Korean Patent Application No. 10-2014-0034963 filed in the Korean Intellectual Property Office on Mar. 25, 2014, the entire contents of which are incorporated herein by reference.

TECHNICAL FIELD

The present invention relates to a local wireless data communication system, and more particularly, to a local wireless data communication system configured to allow a beacon device to automatically set identification information thereof so as to establish local wireless data communication, and a method and apparatus for automatically setting information in the system.

BACKGROUND

The description in this section is merely intended to provide background information of exemplary embodiments set forth herein and should not be understood as describing the related art.

With advances in mobile communication networks and development of terminal specifications, mobile communication terminals which were used merely as communication devices or information providing devices have become modern society's most indispensable items and are tending to evolve into total entertainment devices.

Also, technologies whereby mobile communication terminals can establish local wireless data communication with devices in a short distance have been rapidly developed. One example of such local wireless communication is Bluetooth communication. As the Bluetooth communication has evolved over and over again, Bluetooth Low Energy (BLE) technology has been recently widely used for smartphones, geofencing, mobile payment, etc.

For such local wireless data communication, a terminal device accesses a beacon device by scanning a beacon signal broadcast from the beacon device and identifying the beacon device. Thus, the beacon device sets a Universally Unique IDentifier ((UUID) thereof and transmits the set UUID included in a beacon signal.

However, the UUIDs of the existing beacon devices have been set by inserting the UUIDs in firmware during the manufacture thereof, have been set by an administrator by establishing communication with an application of a management device, or have been set according to a change request. Thus, the administrator is required to make an effort to set the UUIDs of the existing beacon devices.

PRIOR ART DOCUMENT

Patent Document

Korean Laid-open Patent Publication No. 2012-0104677, entitled "Location Authentication Service System Using Wireless AP and Bluetooth Beacon" (publication date: Sep. 24, 2012)

SUMMARY

The present invention is directed to a local wireless data communication system configured to be connected to a service device via the Internet by setting Internet access using Internet access information received from a management terminal device and to automatically set beacon identification information included in a beacon signal by receiving identification information according to a request from the accessed service device, and a method and apparatus for automatically setting information in the system.

One aspect of the present invention provides a beacon device including a first communication unit configured to communicate with at least one terminal device by establishing local wireless data communication, and broadcast a beacon signal; a second communication unit configured to be linked to a service device via the Internet to establish communication so as to automatically set beacon identification information; and an information setting unit configured to access a management terminal device via the first communication unit to receive Internet access information for accessing the service device from the management terminal device, access the service device via the second communication unit by setting the received Internet access information, request and receive identification information from the accessed service device, and control the received identification information to be automatically set as the beacon identification information to be included in the beacon signal.

The beacon device may further include a storage unit configured to store the Internet access information received from the management terminal device and the beacon identification information set using the identification information received from the service device.

The beacon identification information may include at least one among a universally unique identifier (UUID), information regarding transmission power, and information regarding a transmission cycle of the beacon signal.

The information setting unit may receive information regarding Wi-Fi as the Internet access information from the management terminal device, set the received information regarding the Wi-Fi, and request the service device to provide the identification information by accessing the Internet using the set Wi-Fi.

After the information regarding the Wi-Fi received from the management terminal device is set, the information setting unit may disable the access to the management terminal device.

The information setting unit may generate the beacon signal including the automatically set beacon identification information, and broadcast the generated beacon signal in the transmission cycle, the information of which is included in the beacon identification information.

Another aspect of the present invention provides a management terminal device including a communication unit configured to communicate with a beacon device by establishing local wireless data communication so as to automatically set beacon identification information; and a controller configured to be functionally connected to the communication unit, identify the beacon device using a beacon signal transmitted from the beacon device, and access the identified beacon device via the Internet to control Internet access information to be transmitted to the beacon device so that the beacon device may automatically set beacon identification information.

The controller may control the access to the beacon device to be disabled when the beacon device sets the Internet access information.

The controller may access the service device via a communication network to transmit device information for registering beforehand identification information of at least one beacon device, which is managed by the management terminal device, to the service device.

Another aspect of the present invention provides a service device including a communication unit configured to be linked to a management terminal device via a communication network, and linked to at least one beacon device via the Internet to transmit or receive data for automatically setting at least one piece of beacon identification information; a service providing unit configured to be functionally connected to the communication unit to receive device information regarding at least one beacon device, which is managed by the management terminal device, from the management terminal device, register the device information beforehand, and generate identification information using the registered device information regarding a specific beacon device among the at least one beacon device and transmit the generated identification information to the specific beacon device upon receiving a request to provide the identification information from the specific beacon device; and a storage unit configured to store the registered device information and the generated identification information.

The service providing unit may generate the identification information of the specific beacon device by allocating a universally unique identifier (UUID) using the registered device information regarding the specific beacon device and setting transmission power and a transmission cycle, wherein the identification information includes the allocated UUID and information regarding the transmission power and the transmission cycle.

Another aspect of the present invention provides a local wireless data communication system including a management terminal device configured to identify a beacon device using a transmitted beacon signal, and access the identified beacon device to transmit Internet access information to identified the beacon device; the beacon device configured to set the Internet access information received from the management terminal device by accessing the management terminal device, access a service device via the Internet, based on the set Internet access information, request and receive identification information from the accessed service device, and automatically sets the received identification information as beacon identification information to be included in a beacon signal which is to be transmitted; and the service device configured to generate the identification information using registered device information corresponding to the beacon device upon receiving a request to provide the identification information from the beacon device, and transmit the generated identification information to the beacon device.

Another aspect of the present invention provides an automatic information setting method performed by a beacon device, the method including accessing a management terminal device to receive from the management terminal device Internet access information for accessing a service device that is accessed via the Internet; accessing the service device by setting the Internet access information; requesting and receiving identification information from the accessed service device; and automatically setting the identification information as beacon identification information to be included in a beacon signal which is to be transmitted.

Another aspect of the present invention provides an automatic information setting method performed by a beacon device, the method including receiving device information of at least one beacon device from a management terminal device that is linked via a communication network and registering the device; accessing a specific beacon device, which sets Internet access information transmitted from the management terminal device, via the Internet; receiving a request to provide identification information from the specific beacon device; generating the identification information using registered device information of the specific beacon device; and transmitting the identification information to the specific beacon device via the Internet.

Another aspect of the present invention provides a non-transitory computer readable recording medium having recorded thereon a program for performing the automatic information setting methods.

According to the present invention, a beacon device automatically sets identification information, which is received from a service device accessed by the beacon device via the Internet, as beacon identification information to be included in a beacon signal. Accordingly, the beacon device may automatically set and change the beacon identification information in a simple manner without performing a complicated process of accessing the beacon device and changing settings of the beacon device by a management terminal device in order to set or change the beacon identification information.

Thus, the beacon device may be managed in a more convenient and simpler manner without an administrator's efforts. Also, costs and a time needed to manage the beacon device may be reduced.

DETAILED DESCRIPTION

Hereinafter, exemplary embodiments of the present invention will be described in detail with reference to the accompanying drawings. In the following description and the appended drawings, detailed descriptions of well-known functions or constructions will be omitted if they would obscure the invention in unnecessary detail. The same elements are denoted by the same reference numerals throughout the drawings if possible.

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, and not intended to limit the scope of the invention, so it should be understood that other equivalents and modifications could be made thereto without departing from the spirit and scope of the invention.

First, a fire alarm service system using local wireless data communication according to an embodiment of the present invention will be described in detail with reference to the accompanying drawings.

Figure 1:
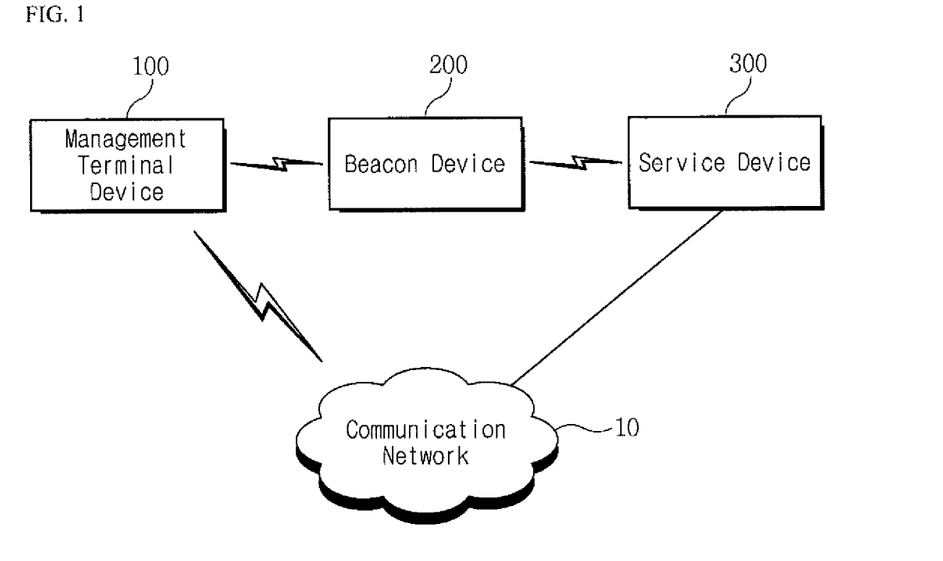
FIG. 1 is a block diagram of a local wireless data communication system according to one embodiment of the present invention.

FIG. 1 is a block diagram of a fire alarm service system using local wireless data communication according to one embodiment of the present invention.

Referring to FIG. 1, the fire alarm service system using local wireless data communication may include a management terminal device 100, at least one beacon device 200, and a service device 300 that are connected via a communication network 10.

The management terminal device 100 means a terminal capable of transmitting or receiving various data according to a user's key manipulation via the communication network 10, and may be one of a tablet personal computer (PC), a laptop computer, a PC, a smartphone, a personal digital assistant (PDA), a smart television (TV), a mobile communication terminal, etc.

Also, the management terminal device 100 may be a terminal capable of establishing voice/data communication using the communication network 10, or may be a terminal including a memory configured to store a browser, a program, and protocols to communicate with the service device 300 via the communication network 10, a microprocessor configured to execute various programs to perform an arithmetic operation and control, etc. That is, the type of the terminal device 100 is not limited provided that the terminal device 100 is capable of establishing server-client communication with the service device 300 and executing a mobile service. The terminal device 100 is a broad concept including various communication computing devices such as a notebook computer, a mobile communication terminal, a PDA, etc. The terminal device 100 may be manufactured to include a touch screen but is not limited thereto.

Also, the management terminal device 100 is a terminal device capable of establishing local wireless data communication, e.g., Bluetooth Low-Energy (BLE) communication which is one example of low-power local wireless data communication, and may access the beacon device 200 through local wireless data communication to transmit or receive messages related to fire alarm Hereinafter, embodiments of the present invention will be described with respect to BLE communication. Here, the present invention is not limited to BLE communication and is also applicable to any other forms of communication via which local wireless data communication can be established between the management terminal device 100 and the beacon device 200.

In particular, the management terminal device 100 according to an embodiment of the present invention may manage the at least one beacon device 200, receive an application for identifying a beacon device using a beacon signal transmitted through local wireless data communication from the service device 300, and install and store the application. Also, the management terminal device 100 may scan a beacon signal generated by the at least one beacon device 200, and identify a beacon device 200 to be accessed using the scanned beacon signal.

Also, the management terminal device 100 may access the identified beacon device 200 to transmit Internet access information to the beacon device 200 so that the beacon device 200 may access the service device 300 via the Internet to automatically set beacon identification information.

The beacon device 200 according to an embodiment of the present invention may be disposed in a certain space, establish BLE communication with at least one terminal device 100, and broadcast, to the at least one terminal device 100, a beacon signal containing a major value, a minor value, a universally unique identifier (UUID), a transmission signal Tx, and information indicating the distance between the beacon device 200 and the at least one terminal device 100.

Also, the beacon device 200 may communicate with at least one terminal device (not shown) to receive a service through local wireless data communication, and broadcast a beacon signal such that the at least one terminal device may scan and identify the beacon signal. The beacon device 200 may be linked to a service device via the Internet to establish communication for automatically setting beacon identification information.

Also, the beacon device 200 may access the management terminal device 100 to receive Internet access information for accessing the service device 300 from the management terminal device 100, and set the received Internet access information. Also, the beacon device 200 may access the service device 300 via the Internet, request and receive identification information from the service device 300, and automatically set the received identification information as beacon identification information to be included in a beacon signal.

The service device 300 may be linked to the management terminal device 100 via the communication network 10, and linked to the at least one beacon device 200 via the communication network 10, i.e., the Internet, to establish communication for automatically setting at least one piece of beacon identification information. The service device 300 may receive and register beforehand device information regarding at least one beacon device, which is managed by the management terminal device 100, from the management terminal device 100. Also, upon receiving a request to provide identification information from a specific beacon device, the service device 300 may generate identification information based on the registered device information regarding the specific beacon device and transmit the identification information to the specific beacon device.

The terminal device 100 and the service device 300 are linked to each other via the communication network 10. The communication network 10 means a network via which data can be transmitted/received according to internet protocol using various wire/wireless communication technologies, such as the Internet, an intranet, a mobile communication network, a satellite communication network, etc. Also, the communication network 10 is coupled to the service device 300 to store computing resources such as hardware, software, etc. The communication network 10 is a concept including closed networks such as a Local Area Network (LAN), a Wide Area Network (WAN), etc., open networks such as the Internet, networks utilizing Code Division Multiple Access (CDMA), Wideband Code Division Multiple Access (WCDMA), a Global System for Mobile Communications (GSM), Long-Term Evolution (LTE), Evolved Packet Core (EPC), etc., next-generation networks which will be realized in the near future, and computing networks.

A structure of a terminal device according to an embodiment of the present invention in a fire alarm service system using local wireless data communication configured as described above will be described in detail with reference to the accompanying drawings below.

Figure 2:
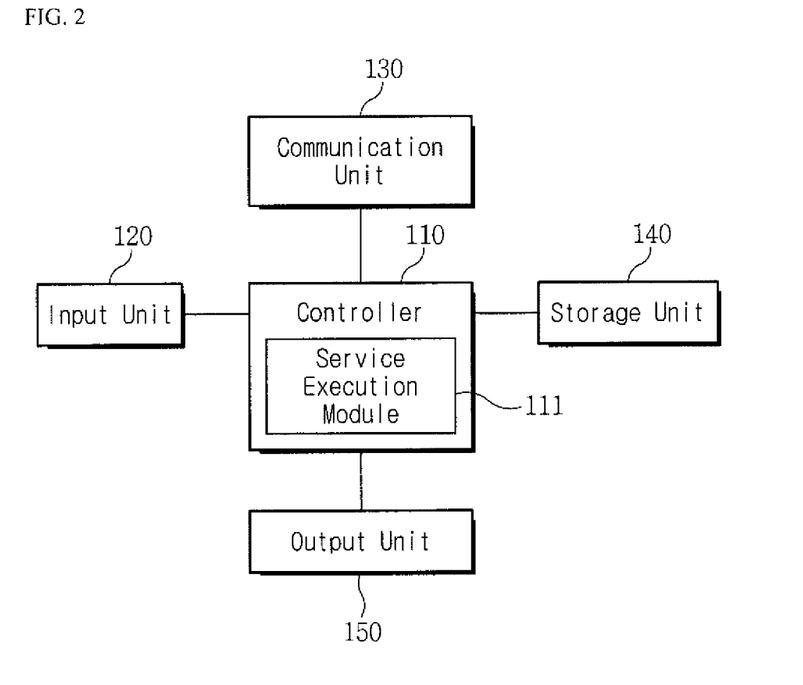
FIG. 2 is a block diagram of a terminal device included in a local wireless data communication system according to one embodiment of the present invention.

FIG. 2 is a block diagram of a management terminal device included in a fire alarm system using local wireless data communication according to one embodiment of the present invention.

Referring to FIGS. 1 and 2, the management terminal device 100 may include a controller 110, an input Unit 120, a communication unit 130, a storage unit 140, and an output unit 150.

The controller 110 may control overall operations of the management terminal device 100. In particular, the controller 110 may control local wireless data communication (i.e., BLE communication) established with the beacon device 200, determine whether a fire occurs using a beacon signal generated by the beacon device 200, and perform control related to a fire alarm. To this end, the controller 110 may include a service execution module 111.

The service execution module 111 may receive an application for managing beacon devices 200 from the service device 300, install the application, and execute the application to manage the beacon device 200. Also, the service execution module 111 may perform BLE communication to check identification information included in a beacon signal broadcast from the beacon device 200, perform control to identify the beacon device 200, and perform an access procedure to access the identified beacon device 200. In this case, the service execution module 111 may transmit or receive information required to manage the beacon device 200 through wired communication to manage the beacon device 200 before BLE communication is established.

Also, the service execution module 111 may identify the beacon device 200 using a beacon signal transmitted from the beacon device 200, access the identified beacon device 200, and control Internet access information to be transmitted to the beacon device 200 so that the beacon device 200 may access the service device 300 via the Internet to automatically set beacon identification information.

Also, when the beacon device 200 sets the Internet access information, the service execution module 111 may control the access to the beacon device 200 to be disabled.

Also, the service execution module 111 may access the service device 300 via the communication network 10 to control device information for registering beforehand identification information of at least one beacon device 200, which is managed by the management terminal device 100, to be transmitted to the service device 300.

The input unit 120 may generate a user input signal corresponding to a user's request or information according to the user's manipulation. The input unit 120 may be embodied as various input units that have been used in common or that will be used communication unit 130 may in common in the near future. Examples of the input unit 120 may include not only general input devices such as a keyboard, a mouse, a joystick, a touch screen, a touch pad, etc., but also gesture input units capable of sensing a user's motion and generating a specific input signal. In particular, the input unit 120 according to an embodiment of the present invention may generate a Bluetooth 'on' input signal and an application execution input signal.

The communication unit 130 may communicate with the service device 300 via the communication network 10 to transmit or receive messages related to automatic information setting. The communication unit 130 may transmit or receive data according to various communication methods including a wired communication method and a wireless communication method. Furthermore, the communication unit 130 may transmit or receive data using at least one communication methods. To this end, the communication unit 130 may include a plurality of communication modules for transmitting or receiving data according to different communication methods. In particular, the communication unit 130 according to an embodiment of the present invention may transmit or receive messages related to establishing local wireless data communication (e.g., BLE communication) with the beacon device 200, and transmit or receive messages for transmitting Internet access information so that the beacon device 200 may access the service device 300 to automatically set beacon identification information.

The storage unit 140 stores information required to operate the management terminal device 100. In particular, the storage unit 140 according to an embodiment of the present invention may store device information and Internet access information regarding at least one beacon device 200 managed by the management terminal device 100. Examples of the storage unit 140 include magnetic media (e.g., a hard disc, a floppy disk, a magnetic tape, etc.), optical media (e.g., a compact disk read-only memory (CD-ROM), a digital versatile disk (DVD), etc.), magneto-optical media (e.g., a floptical disk), a ROM, a random access memory (RAM), a flash memory, etc.

The storage unit 140 may further store not only application programs required to perform functions/operations according to embodiments of the present invention but also screen images to be output to a display unit of the output unit 150. When the display unit is embodied as a touch screen, the storage unit 140 may store a key map, a menu map, etc., to manage the touch screen. Here, the key map and the menu map may be embodied in various forms. The storage unit 140 may also store an operating system (OS) for booting the management terminal device 100 and managing various elements of the management terminal device 100 described above, and various user functions.

The output unit 150 is a device configured to provide a result of operating the management terminal device 100 or information regarding a state of the management terminal device 100 such that a user may identify the result or the state, and may include, for example, a display unit that visually outputs data via a screen thereof, a speaker that outputs audible sound, etc. In particular, the output unit 150 according to an embodiment of the present invention may display a screen image related to a fire alarm service driven by the management terminal device 100, and output a screen image for executing an application for managing the beacon device 200. Furthermore, the output unit 150 may display information related to a fire alarm received from the service device 300 on an execution screen image. Also, the output unit 150 may output a screen image for manipulating BLE communication to be on/off.

Next, the structure of a beacon device configured to automatically set information in a local wireless data communication system will be described in detail with reference to the accompanying drawings.

Figure 3:
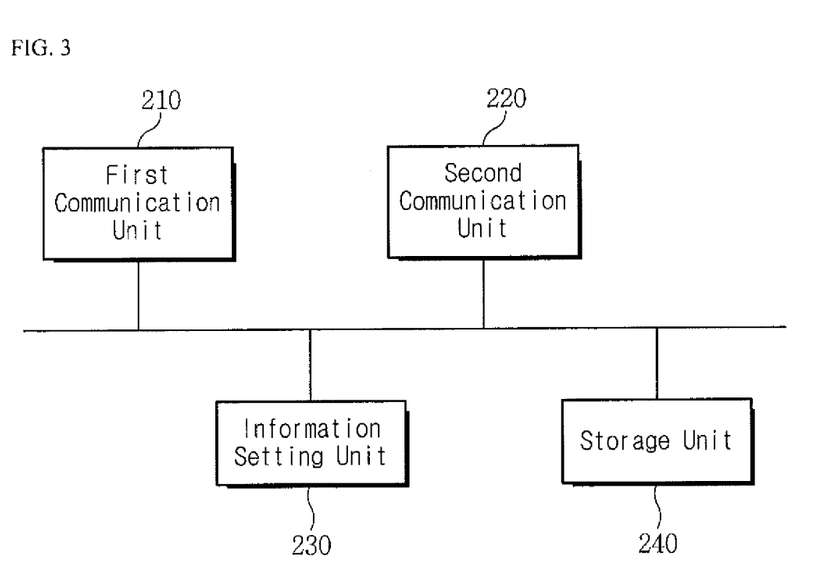
FIG. 3 is a block diagram of a beacon device included in a local wireless data communication system according to one embodiment of the present invention.

FIG. 3 is a block diagram of a beacon device 200 included in a local wireless data communication system according to one embodiment of the present invention.

Referring to FIG. 3, the beacon device 200 may include a first communication unit 210, a second communication unit 220, an information setting unit 230, and a storage unit 240.

The first communication unit 210 according to an embodiment of the present invention may communicate with at least one terminal device (not shown) to be provided with a service and the management terminal device 100 by establishing local wireless data communication. In particular, the first communication unit 210 may broadcast a beacon signal, and transmit or receive a message for accessing a terminal device accessed based on the broadcast beacon signal and a message for providing sensing information.

Also, the second communication unit 220 according to an embodiment of the present invention may be linked to the service device 300 via the communication network 10, i.e., the Internet, to perform communication for automatically setting beacon identification information. Furthermore, the second communication unit 220 may transmit or receive data using at least one communication method. To this end, the second communication unit 220 may include a plurality of communication modules for transmitting/receiving data according to different communication methods.

The information setting unit 230 may control the beacon device 200 to be linked to at least one terminal device and the management terminal device 100 by establishing local wireless data communication using the first communication unit 210, and broadcast a beacon signal in a predetermined space.

Also, the information setting unit 230 may access the management terminal device 100 using the first communication unit 210 to receive Internet access information for accessing the service device 300 from the management terminal device 100, and set access to the service device 300 using the Internet access information. Also, the information setting unit 230 may access the service device 300 using the second communication unit 220, and receive identification information, which is generated according to a request, from the service device 300. Thus, the information setting unit 230 may automatically set the received identification information as beacon identification information to be included in a beacon signal, and generate and broadcast the beacon signal including the set beacon identification information. Here, the beacon identification information may include at least one among a UUID, information regarding transmission power, and information regarding a transmission cycle of the beacon signal.

Specifically, the information setting unit 230 may receive Wi-Fi information as the Internet access information from the management terminal device 100, set the Wi-Fi information as information (WiFi) for accessing the service device 300, and access the Internet using the set WiFi to request the service device 300 to provide the identification information. Also, the information setting unit 230 sets the WiFi information received from the management terminal device 100 and disable the access to the management terminal device 100.

Also, the information setting unit 230 may generate a beacon signal including the automatically set beacon identification information, and broadcast the beacon signal according to the information regarding the transmission cycle included in the beacon identification information.

The storage unit 240 may store information related to automatically setting the beacon identification information. In detail, the storage unit 240 may store the Internet access information received from the management terminal device 100, the identification information received from the service device 300, the set beacon identification information, and information required to generate the beacon signal. Examples of the storage unit 240 include magnetic media (e.g., a hard disc, a floppy disk, a magnetic tape, etc.), optical media (e.g., a CD-ROM, a DVD, etc.), magneto-optical media (e.g., a floptical disk), a ROM, a RAM, a flash memory, etc.

Next, the structure of a service device configured to automatically set information in a local wireless data communication system will be described in detail with reference to the accompanying drawings.

Figure 4:
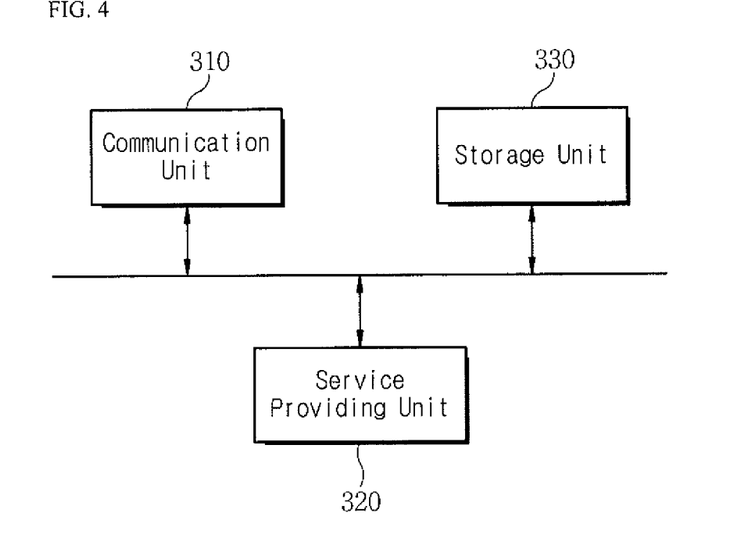
FIG. 4 is a block diagram of a service device included in a local wireless data communication system according to one embodiment of the present invention.

FIG. 4 is a block diagram of a service device 300 included in a local wireless data communication system according to one embodiment of the present invention Referring to FIG. 4, the service device 300 may include a communication unit 310, a service providing unit 320, and a storage unit 330.

The communication unit 310 may transmit or receive messages related to automatic information setting by communicating with the management terminal device 100 and the beacon device 200 via the communication network 10. In particular, the communication unit 310 may communicate with the beacon device 200 via the Internet to transmit identification information for automatically setting beacon identification information to the beacon device 200. The communication unit 310 may transmit or receive data using various communication methods including a wired communication method and a wireless communication method. In addition, the communication unit 310 may transmit or receive data using at least one communication method. To this end, the communication unit 310 may include a plurality of communication modules for transmitting or receiving data using different communication methods.

The service providing unit 320 may receive and register beforehand device information regarding at least one beacon device 200 managed by the management terminal device 100 from the management terminal device 100. Also, when the service providing unit 320 receives a request to provide identification information from a specific beacon device 200, the service providing unit 320 may generate identification information based on the registered device information regarding the specific beacon device 200 and transmit the generated identification information to the specific beacon device 200.

The storage unit 330 may store information related to automatically setting beacon identification information. In detail, the storage unit 330 may store device information (e.g., device specification information) regarding beacon devices 200 received from the management terminal device 100, and store the generated identification information. Examples of the storage unit 330 include magnetic media (e.g., a hard disc, a floppy disk, a magnetic tape, etc.), optical media (e.g., a CD-ROM, a DVD, etc.), magneto-optical media (e.g., a floptical disk), a ROM, a RAM, a flash memory, etc.

Next, a method of automatically setting information in a local wireless data communication system as described above will be described in detail with reference to the accompanying drawings below.

Figure 5:
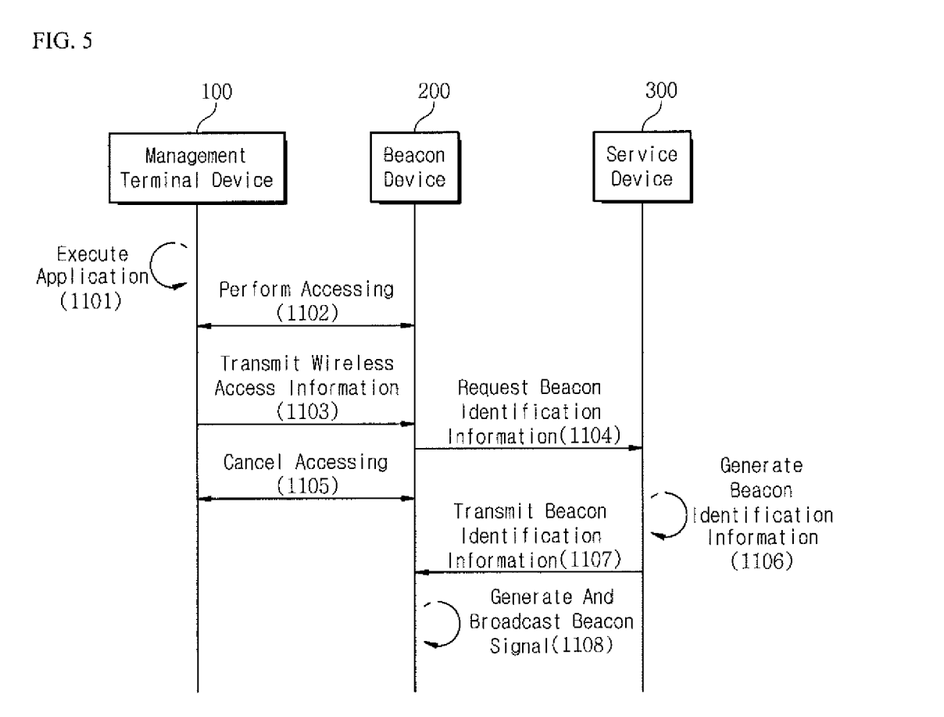
FIG. 5 is a flow chart of a method of automatically setting information in a local wireless data communication system according to one embodiment of the present invention.

FIG. 5 is a flow chart of a method of automatically setting information in a local wireless data communication system according to one embodiment of the present invention.

Referring to FIG. 5, in operation 1101, the management terminal device 100 receives an application for managing at least one beacon device 200 from the service device 300, installs and stores the application, and executes the stored application to manage a beacon device 200 among the at least one beacon device 200.

In operation 1102, the management terminal device 100 accesses the beacon device 200 to be managed. In operation 1103, when the management terminal device 100 accesses the beacon device 200, the management terminal device 100 transmits Internet access information to the beacon device 200. Thus, the beacon device 200 sets Internet access (WiFi) based on the Internet access information. Next, in operation 1103, the management terminal device 100 disables the access to the beacon device 200.

Next, in operation 1104, the beacon device 200 accesses the Internet using the set WiFi to access the service device 300, and transmits a message requesting identification information to the service device 300. In this case, the beacon device 200 may insert internet address information and an identifier assigned during the manufacture thereof into the message requesting the identification information, and transmit the message.

In operation 1105, the service device 300 extracts device information corresponding to the information included in the message requesting the identification information, and generates the identification information using the extracted device information. That is, the service device 300 allocates a UUID using the device information, and sets transmission power and a transmission cycle of a beacon signal to generate identification information including the allocated UUID and information regarding the set transmission power and transmission cycle. Next, in operation 1106, the service device 300 transmits the identification information to the beacon device 200.

In operation 1107, the beacon device 200 automatically sets the identification information as beacon identification information. In operation 1108, the beacon device 200 generates a beacon signal including the set beacon identification information, and broadcasts the beacon signal in the set transmission cycle.

Program commands to be recorded may be specially designed and configured for the present invention or may be well known to those of ordinary skill in the computer software field. For example, recording media include hardware devices specially configured to store and execute program commands, such as magnetic media (e.g., a hard disc, a floppy disk, a magnetic tape, etc.), optical media (e.g., a CD-ROM, a DVD, etc.), magneto-optical media (e.g., a floptical disk), a ROM, a RAM, a flash memory, etc. Examples of program commands may include not only machine language codes made by a compiler but also high-level language codes that can be executed by a computer using an interpreter, etc. Such a hardware device may be configured to be operated using at least one software module to perform an operation of the present invention, and vice versa.

Also, a computer program (which may be also known as a program, software, a software application, a script or code) installed in a device according to the present invention and capable of performing a method according to the present invention may be made in various forms, e.g., a language compiled or interpreted or a programming language including a transcendental or procedural language, and expanded in various forms including a independent program, module, component, subroutine, or another unit that is usable in a computer environment. The computer program does not always correspond to a file included in a file system. A program may be stored in a unit file provided to a requested program, multiple interactive files (e.g., at least one file storing a module, a sub-program or a part of a code), or a part of a file storing another program or data (e.g., at least one script stored in a markup language document). The computer program may be stored in one site or distributed and stored in a plurality of sites, and expanded to be performed by a plurality of computers connected via a communication network or one computer.

The embodiments set forth in the present specification and drawings are merely examples provided to help understand the present invention and are not intended to restrict the scope of the present invention. It would be obvious to those of ordinary skill in the art that the above exemplary embodiments are to cover all modifications, equivalents, and alternatives falling within the scope of the invention.

Also, although the details of the exemplary embodiments are described in the present disclosure, they should not be construed as limiting an invention or the scope of an invention to be claimed. Rather, the details of these embodiments should be understood as unique features of exemplary embodiments of a specific invention. The unique features described in the present disclosure may be combined in a single embodiment according to the context of an individual embodiment. On the contrary, various features described according to the context of a single embodiment may be also embodied in a plurality of embodiments individually or in appropriate sub-combination. Furthermore, although the features may be realized in a particular combination and described as originally claimed, at least one feature according to a claimed combination may be excluded from this combination in some cases and the claimed combination may be changed into a sub-combination or a modification of the sub-combination.

Similarly, although operations are illustrated in a specific order in the drawings, it should not be construed that the operations are performed in the specific order or a sequential order or all of the operations are performed to obtain a desired result. Also, although various system components may be separated in the embodiments set forth herein, the separation should not be construed as being required in all embodiments. In general, the program components and systems described above may be integrated into a single software product or packaged into multiple software products.

The present invention relates to a local wireless data communication system, and a method and apparatus for automatically setting information in the system, in which a beacon device automatically sets identification information, which is received from a service device accessed by the beacon device via the Internet, as beacon identification information to be included in a beacon signal. Accordingly, the beacon identification information may be automatically set and changed by the beacon device in a simple manner without performing a complicated process of accessing the beacon device and changing settings of the beacon device by a management terminal device to set or change the beacon identification information.

Thus, according to the present invention, a beacon device may be managed without an administrator's efforts and in a more convenient and simpler manner while saving maintenance time and costs.

Furthermore, the present invention is industrially applicable, since it is expected to be marketable and to make a high profit and it is obvious that the present invention can be practically accomplished.

In this specification, exemplary embodiments of the present invention have been classified into the first, second and third exemplary embodiments and described concisely. However, respective steps or functions of an exemplary embodiment may be combined with those of another exemplary embodiment to implement still another exemplary embodiment of the present invention.

What is claimed is:
1. A beacon device comprising:
 a first communication unit configured to communicate with at least one terminal device by establishing local wireless data communication, and broadcast a beacon signal;
 a second communication unit configured to be linked to a service device via the Internet to establish communication so as to automatically set beacon identification information; and
 an information setting unit configured to access a management terminal device via the first communication unit to receive Internet access information for accessing the service device from the management terminal device, access the service device via the second communication unit by setting the received Internet access information, request and receive identification information from the accessed service device, and control the received identification information to be automatically set as the beacon identification information to be included in the beacon signal, wherein the management terminal device controls the access to the beacon device to be disabled when the beacon device sets the Internet access information.

2. The beacon device of claim 1, further comprising a storage unit configured to store the Internet access information received from the management terminal device and the beacon identification information set using the identification information received from the service device.

3. The beacon device of claim 1, wherein the beacon identification information comprises at least one among a universally unique identifier (UUID), information regarding transmission power, and information regarding a transmission cycle of the beacon signal.

4. The beacon device of claim 1, wherein the information setting unit receives information regarding Wi-Fi as the Internet access information from the management terminal device, sets the received information regarding the Wi-Fi, and then requests the service device to provide the identification information by accessing the Internet using the set Wi-Fi.

5. The beacon device of claim 4, wherein, after the information regarding the Wi-Fi received from the management terminal device is set, the information setting unit disables the access to the management terminal device.

6. The beacon device of claim 1, wherein the information setting unit generates the beacon signal including the automatically set beacon identification information, and broadcasts the generated beacon signal in the transmission cycle, the information of which is included in the beacon identification information.

7. A service device comprising:
a communication unit configured to be linked to a management terminal device via a communication network, and linked to at least one beacon device via the Internet to transmit or receive data for automatically setting at least one piece of beacon identification information;
a service providing unit configured to be functionally connected to the communication unit to receive device information regarding at least one beacon device, which is managed by the management terminal device, from the management terminal device, register the device information beforehand, and generate identification information using the registered device information regarding a specific beacon device among the at least one beacon device and transmit the generated identification information to the specific beacon device upon receiving a request to provide the identification information from the specific beacon device; and
a storage unit configured to store the registered device information and the generated identification information,
wherein the service providing unit generates the identification information of the specific beacon device by allocating a universally unique identifier (UUID) using the registered device information regarding the specific beacon device and setting transmission power and a transmission cycle, wherein the identification information comprises the allocated UUID and information regarding the transmission power and the transmission cycle.

8. A local wireless data communication system comprising:
a management terminal device configured to identify a beacon device using a transmitted beacon signal, and access the identified beacon device to transmit Internet access information to the identified beacon device;
the beacon device configured to set the Internet access information received from the management terminal device by accessing the management terminal device, access a service device via the Internet, based on the set Internet access information, request and receive identification information from the accessed service device, and automatically set the received identification information as beacon identification information to be included in a beacon signal which is to be transmitted; and
the service device configured to generate the identification information using registered device information corresponding to the beacon device upon receiving a request to provide the identification information from the beacon device, and transmit the generated identification information to the beacon device,
wherein the management terminal device controls the access to the beacon device to be disabled when the beacon device sets the Internet access information.

9. The local wireless data communication system of claim 8, wherein the management terminal device accesses the service device via a communication network to transmit device information for registering beforehand identification information of at least one beacon device, which is managed by the management terminal device, to the service device.

* * * * *